April 14, 1925.  1,533,107

J. GOOD

BURNER CARBURETOR COMBINATION

Original Filed Nov. 6, 1919

John Good
INVENTOR

BY
Jeffrey, Kimball & Eggleston
ATTORNEYS

Patented Apr. 14, 1925.

1,533,107

UNITED STATES PATENT OFFICE.

JOHN GOOD, OF GARDEN CITY, NEW YORK, ASSIGNOR TO GOOD INVENTIONS CO., OF NEW YORK, N. Y., A CORPORATION OF NEW YORK.

BURNER CARBURETOR COMBINATION.

Original application filed November 6, 1919, Serial No. 336,027. Patent No. 1,377,989, dated May 10, 1921.
Divided and this application filed April 30, 1921. Serial No. 465,734.

*To all whom it may concern:*

Be it known that I, JOHN GOOD, United States citizen, resident of Garden City, Long Island, New York, have invented the following described Improvements in Burner Carburetor Combinations.

The invention relates to means for supplying heat to the intake passages of internal combustion engines and more particularly and in its preferred form it relates to the means of adapting suction-operated liquid fuel burners to this purpose and consists in the mode of connection of the burner to the intake passage so that it will be subject to an operating suction effect which might not otherwise be available to cause or maintain its operation, thereby enlarging the field of usefulness of this method of heating. This application is a division of my co-pending application, Patent No. 1,377,989, dated May 10, 1921.

Figure 1:
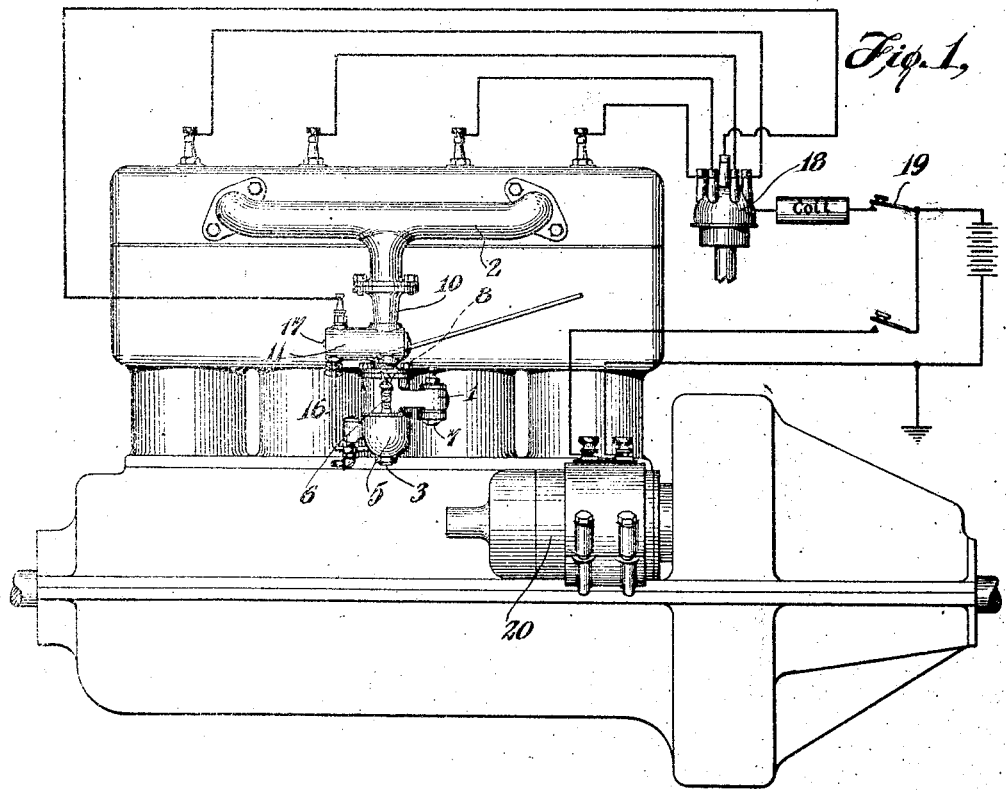
Figure 2:
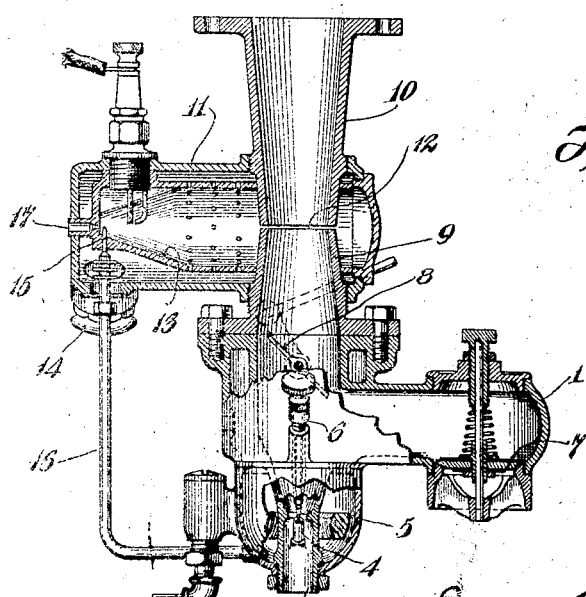

In the accompanying drawings Figure 1 represents a conventional form of automotive engine having the invention applied, and Figure 2 is an axial, larger scale section of the burner and carburetor illustrating the mode of connection.

The carburetor 1 is connected to the engine intake header 2 through the intervention of an interposed intake structure or fitting which forms part of the intake passage and constitutes the connection to the burner according to the preferred form of this invention. The entire passage through which air or combustible mixture passes to the engine is regarded as the intake passage. The carburetor comprises a primary main air entrance 3 and an associated fuel spray nozzle 4 receiving fuel from an ordinary float chamber 5 under the control of a regulating valve 6 and also has an auxiliary air entrance 7, adjustable as usual, all of these parts cooperating to produce an engine operating mixture of substantially constant proportions as will be understood and being capable of various modifications according to the well known principles of engine carburation. The carburetor 1 is provided with a throttle 8 and bolted to the lower section 9 of the connection structure above referred to, which is a two part Venturi tube, the upper recovery part 10 of which is directly bolted to the intake header 2. The two parts of the Venturi tube are held together by the main casing 11 of the suction burner into which they are respectively threaded as indicated in the drawings. Their proximate ends, within the casing, are located substantially at the throat of the Venturi tube and form between them a thin annular crevice 12 representing the suction connection between the intake passage and the burner, that is to say, the outlet for the burner products to the intake. It will be obvious that the thickness of the crevice 12 is subject to variation by manipulating the screw joints which secure the sections to the casing although there is no limitation to the use of screw threaded joints for this purpose nor to the use of a two-part Venturi as will presently appear. The burner contains an interior air distributing shell 13 extended around the crevice 12 and provided with rings of holes through which air is adapted to flow to the interior space from the main burner air entrance 14, the latter being provided with a spring seated air valve similar to the air valve 7 and preferably also provided with means for adjusting the spring tension. The interior shell 13 embraces the nozzle orifice 15 of a fuel line 16 connected to the carburetor float chamber 5, such orifice being in atomizing relation to one or more air channels 17 leading direct from atmosphere. The nozzle is provided with fins to keep it cool on long periods of operation. A spark plug or equivalent electric igniter is mounted in the burner casing with its spark gap located in the path of the spray produced by the air jet 17 just before such spray mixes with the air inflowing through the holes of the air distributor shell 13. The general construction and design of the burner above described are shown in my prior application above referred to and in my issued patents and need not be further described inasmuch as other burner designs may be equally suitable as the suction-operated source of heat. The spark plug will be observed to be connected in the present case to the ignition system of the engine which is diagrammatically indicated in Figure 1 as comprising the usual distributor head 18, and an ignition switch 19 connected to the storage battery which serves also to operate the starting motor 20, but any other means of operating the igniter may be equally suitable.

When the engine is in rotation either by its own operation or by the starting motor or a hand crank, the suction effect transmitted from the intake passage through the crevice 12 to the interior of the burner causes coincident delivery of liquid fuel spray and air to the latter and the ignition of the mixture by the spark plug. By reason of the occurrence of the ignition in a part of the mixing space where the mixture is relatively rich in fuel, i. e. in the fuel spray, no explosion results even though the proportions of fuel and air are those of an explosive mixture or those which give substantially complete combustion with no great excess of either fuel or air in the products. The proportion-controlling members of the burner are set to deliver such proportions and to maintain them without substantial change notwithstanding variation in the transmitted suction effect and hence in the rate of combustion in the burner. The flame and combustion products resulting from the ignition are drawn toward and against the Venturi tube and into the crevice 12 where they serve to heat not only the throat portion of the Venturi tube but also, by their direct contact and commingling with the medium flowing in the intake passage, they serve to heat the latter. If the crevice be widely opened the flame itself may penetrate into the intake passage, and if the flowing medium be the normal carburetor mixture, as in the case in hand, will vaporize it without inflaming it. Ordinarily, however, the crevice is set close, so that the flame if long enough to reach it, is extinguished or pinched off by passage through it and so that thus no flaming gas enters the intake. In such case the result of pinching off the flame is to admit a hot, partially-burned gaseous medium to the engine which is of itself explosive and may beneficially be added to the carburetor mixture. If the burner proportions be set to give clean and complete combustion the addition of such gaseous medium to the carburetor mixture will not affect the proportions of fuel and air entering the engine. It is preferred, however, to design the combustion space so that the tip of the normal flame will not extend beyond the tube or quite reach it and so that merely the hot products of the complete combustion enter the intake passage.

It will be apparent that the engine throttle 8 may, if desired, be completely closed when it is desired to set the burner in operation, and this will obviously transmit the full suction effect produced by the engine to the burner, but it is generally desired that the burner and carburetor shall begin operation coincidently so that the hot burner products and the carburetor mixture may mingle at once and flow together to the engine, and on this account it is necessary that the throttle be partly open when the engine is being cranked and the crevice 12 is made large enough, in diameter and thickness, to transmit an operating suction to the burner under these conditions and so as to produce a medium on which the engine starts at once even in extremely cold weather. The burner thus started continues in action for as long as an operative degree of suction is present in the intake to be transmitted to it. The degree of suction thus available for burner operation obviously depends on the restriction to flow that happens to be interposed between the location of the burner's outlet connection and the entrance to the intake passage and in some types of engines and carburetors the suction effect is not always sufficient to keep the burner in operation when its heat is needed. When the burner outlet is located between the throttle and the engine as in the case in hand, it will be apparent that the suction effect is maximum when the engine is idling and that it diminishes as the throttle is opened, and hence that the burner may cease action before full load conditions are reached or before it is desired to have it cease. The location of the burner outlet at the throat of a Venturi tube which forms part of the intake passage, insures the transmission of a stronger suction effect to the burner than would otherwise be the case and produces such result without imposing any measurable obstruction to the intake flow and thereby has the effect of keeping the burner in action for a longer period or when the throttle is opening, or otherwise, as may be desired according to the circumstances. The flow velocity through the Venturi tube of itself maintains a relative depression at its throat without reference to restrictions imposed by the carburetor air entrance or the throttle, and supplemental to the depression produced thereby, and by the use of such a Venturi section at any point in the intake passage, the suction effect can be suited to the characteristics of the burner to maintain such heating effect as may be required, it being obvious that the shape of the burner outlet whether a crevice or other form of hole, and whether adjustable or not, is in any case adapted, in size, to the suction available. When the Venturi tube is interposed between the engine and the carburetor, its action is beneficial in that it produces a high degree of turbulence in the medium flowing through it, which results not only in thorough mixture of the air and fuel components of the carburetor mixture but also a prompt mixture of that mixture with the burner products and this double mixing effect, in conjunction with the contact vaporization occurring on the hot tube wall produces a very efficient and satisfactory engine-operating medium out of low grade fuels.

Thus it will be seen that the engine charge mixture is perfected for combustion in the engine not only by the passage of the carburetor mixture through a heated Venturi tube, but also by the introduction into such mixture of a hot fluid medium, which medium may if desired contain unburned fuel. Vaporization produced in this way is efficiently and rapidly accomplished.

Claims—

1. In an internal combustion engine, the combination of an intake passage including a carburetor and a Venturi tube, and a burner connected to the throat portion of said tube and adapted to supply combustion products for admixture with the carburetor fuel.

2. The combination of an engine intake passage including a carburetor, a Venturi tube forming part of said passage between the carburetor spray nozzle and the engine and a suction operated burner connected to the passage in the throat region of said tube.

3. The combination of an engine intake passage including a carburetor and having a throttle, a Venturi tube forming part of said passage between the throttle and the engine and a burner connected to said Venturi tube so as to be subject to the pressure depression caused thereby.

4. The combination of an engine intake passage formed in part by a Venturi tube and including a carburetor, a suction operated burner having its outlet connected to said tube and a common constant level fuel receptacle for said carburetor and burner.

5. The combination of an engine intake passage including a carburetor and a Venturi tube and a burner having its combustion space disposed round about said Venturi tube and opening into the interior of said passage.

6. In an internal combustion engine an intake passage comprising a two part Venturi tube with an opening between the parts thereof and a suction operated burner having its combustion space in connection with said opening.

7. In an internal combustion engine a junction fitting between the engine and the carburetor, comprising a Venturi tube and a burner mounted thereon.

8. Means for perfecting the charge mixture in internal combustion engines, comprising the combination of a carburetor, a Venturi tube conducting mixture therefrom to the engine and means for admitting a heated medium into said mixture in the throat portion of the Venturi tube.

9. Means for perfecting the charge mixture in internal combustion engines comprising the combination of a carburetor, a throttle, a Venturi tube between the throttle and the engine and means for admitting a hot fluid medium into the throat portion of said Venturi tube for mixture with the carburetor mixture flowing therein.

10. In an internal combustion engine, the combination of a carburetor and a Venturi tube included in the intake passage, means for imparting heat to the wall of said passage and an entrance in the throat portion of said Venturi tube for admitting a hot fluid medium into mixture with the carburetor mixture flowing therethrough.

In testimony whereof, I have signed this specification.

JOHN GOOD.